Aug. 8, 1933.　　　　C. NUHRING　　　　1,921,938
HOSE REEL
Filed March 8, 1929
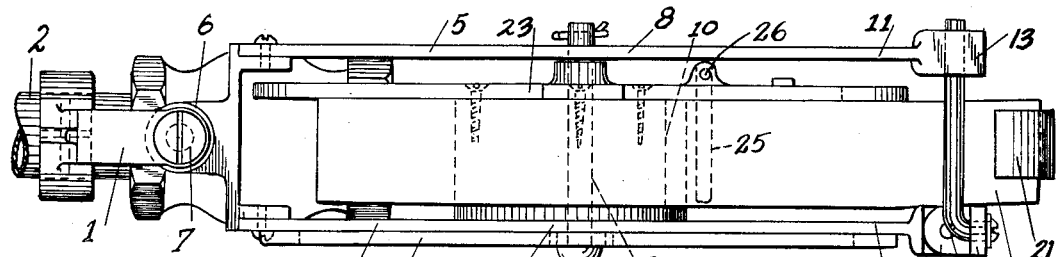
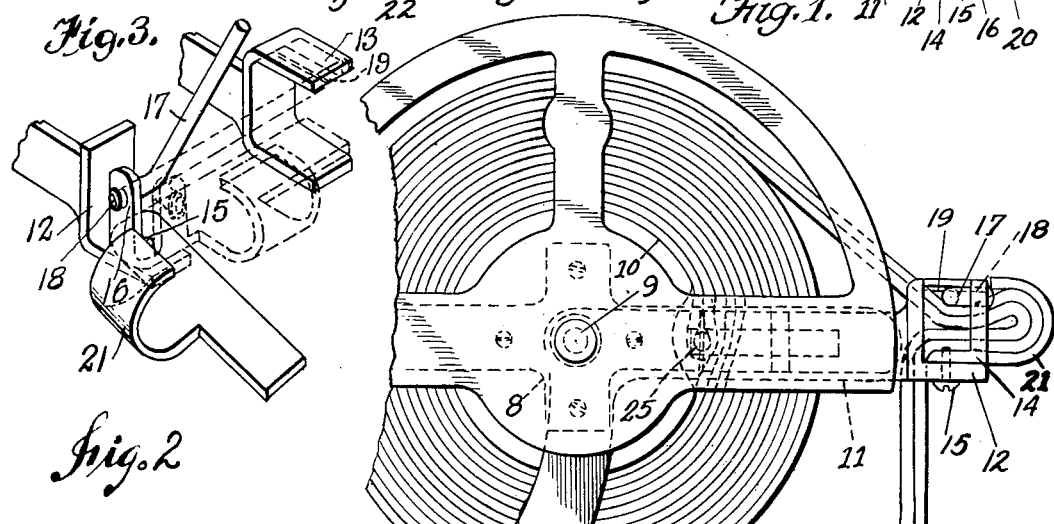
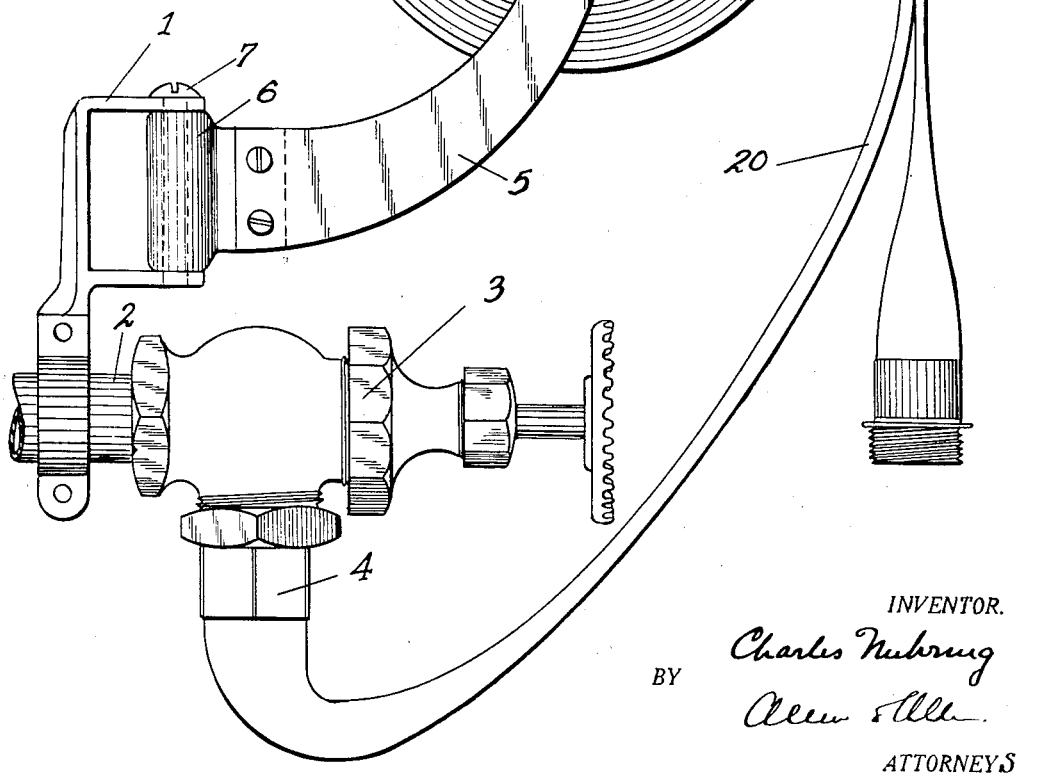
INVENTOR.
Charles Nuhring
BY
Allen & Allen
ATTORNEYS Patented Aug. 8, 1933

1,921,938

UNITED STATES PATENT OFFICE 1,921,938

HOSE REEL

Charles Nuhring, Cincinnati, Ohio

Application March 8, 1929. Serial No. 345,452

10 Claims. (Cl. 299—78)

My invention relates to hose reels and particularly to hose reels for supporting fire extinguishing and similar hose in convenient position for instant use, and to improvements in hose reels which enable the user to turn on the water and proceed quickly to the fire without danger that the hose will become kinked during the progress of the user from the reel to the place from which he desires to extinguish the fire.

In reeling hose it is customary to wrap the hose upon the reel in double folds. This requires the looping of the hose, and the attachment thereof on the hub of the reel and it has been customary to provide a pin pivoted on the spacer which temporarily holds the loop and then during the withdrawal of the hose swings on its pivot thereby releasing the loop of the hose. Such an arrangement is shown in my Patent No. 1,322,604, and while a pivoted pin is of assistance in operating the reel, I have found that a particular type of pin pivoted in a particular manner is less likely to foul the hose than the type shown in the patent aforenoted.

In the aforenoted patent there is also shown a clamp for compressing the hose, forming the supply pipe and the hose leading to the nozzle, so that the flow of water is temporarily choked. The structure disclosed in my patent has the disadvantage that the water pressure has a tendency to force open the clamp before it is manually withdrawn. In the improvements in reels to which this application relates, it is my object to provide a clamping device which retains loops of the flattened hose so that water pressure tends to make the seal tighter until such time as the clamp is manually withdrawn with the removal of the nozzle.

Specifically, it is the object of my invention to provide a clamping device associated with the reel constructed and arranged to retain folds of hose until the instant when the clamp is released by the manual withdrawal of the hose nozzle.

The above and other objects to which reference will be made in the ensuing disclosure, I accomplish by the certain combination and arrangement of parts of which I have shown a preferred embodiment.

Referring to the drawing:

Figure 1 is a plan view of a preferred assembly.

Figure 2 is a side elevation of the assembly shown in Figure 1.

Figure 3 is a detail perspective view of the clamp for holding of the flattened hose.

A supporting bracket 1 is preferably clamped about a water supply pipe 2. The pipe has the usual controlling valve 3, which admits water to the hose coupling device 4. Supporting arms 5 are connected to a swivel block 6 which has a vertical pivot pin 7 which adjustably mounts the block in the bracket 1. The supporting arms form at the port irons 8 the support for the axle 9 of the reel hub 10. Forwardly extending portions 11 of the arms have bifurcated portions 12, 13, which mount the clamping device.

The clamping device shown in Figures 1 to 3 consists of an arm 14 pivoted in the member 12 at 15. An upstanding arm 16 provides a mounting for a pivot pin 17 as at 18. The pin is of such length as to extend between the bifurcated arms 13 and bear against the under side of the upper arm where a rib 19 provides a frictional retainment for the end of the pin.

The arm 14 is of such length as to extend to and bear against the upper surface of the underneath arm 13. The hose indicated at 20 may thus be flattened and looped to form a double fold and inserted within a return bent extension 21 of the arm 14, with the pin 17 and the main body of the arm 14 clamping the double folded portion of the hose tightly between them. When water pressure is put on the hose, due to opening the valve 3, there is no tendency for the clamp to be released as the delivery end of the hose, carrying the nozzle has to be manually removed from the clamp by a jerk before the arm 14 will swing on its pivot. When the arm 14 is swung on its pivot the pin 17 is released from frictional engagement under the arm 13, and the hose may be removed.

The reel consists of spacers, one indicated at 22, and of semicircular shape and mounted on the supporting arm 5, and the other indicated at 23, and mounted directly on the hub 10 of the reel. The arm 23 has a slot 24 extending therein and an aligning pin 25. Bosses 26, extending from the outer surface of the arm, provide a pivotal mounting for the pin. The pin will seat within the slot when the hose is removed thereby clearing the hose and preventing any tendency to foul.

The operation of the reel will be apparent. In reeling up the hose a loop is formed in it substantially midway of its length between its inlet and outlet ends and the loop is then placed over the pin 25, which is laid flat against the periphery of the hub. The reel is then rotated by turning the arm 23 until the hose is almost all reeled up in this folded condition. Then a loop made of portions of the hose near its inlet and outlet ends, respectively, is placed within the return bent portion of the arm 14, the loop of the portion near the outlet end of the hose being inside the other loop. The arm is then swung on its pivot so that the pin and arm are retained within the bifurcated arms 13, clamping the four loop portions together.

When the user wishes to use the hose of extinguishing a fire he first turns on the water. The clamping prevents water forcing its way into the reeled part of the hose, and thus fouling it before he has started for the fire. As soon as the user grasps the nozzle and starts to the fire the inner loop is pulled out, and with it the outer loop, and the hose unrolls so rapidly that there is no danger of fouling.

While I have illustrated only one example of my invention, modifications of the apparatus shown will occur in practice; and I am not limited to the precise disclosure herein, but claim:

1. A hose clamping device for use with hose supporting and storing means, consisting of a bracket, a member movably supported by the bracket having a curve of substantial degree in position for receiving and retaining loops of two parts of a hose in its curve, and means for holding said member in said position releasable with withdrawal of the outlet end of the hose.

2. A hose clamping device for use with hose supporting and storing means, consisting of a bracket, a member movably supported by the bracket having a curve of substantial degree in position for receiving and retaining loops of two parts of a hose in its curve, and holding means for engaging the hose holding the loops of the hose within the curve of the curved member, said holding means being also operable to hold the member in said position and being releasable by said loops upon withdrawal of the outlet end of the hose.

3. A hose clamping device for use with hose supporting and storage means, comprising a bracket, a pivoted member mounted on said bracket, said pivoted member having a curved portion formed so as to provide a storage space for receiving loops of two parts of a hose, a rod pivotally mounted in said pivoted member and adapted to clamp across the loops of said hose, and holding means for the rod, said rod being releasable from the holding means with withdrawal of the outlet end of the hose.

4. A hose clamping device for use with a hose supporting and storage means, comprising a support, a member movably mounted on said support and having a recess so formed as to provide a storage space for receiving loops of two flattened parts of a hose, an element movably mounted on said member and adapted to clamp across the loops of said hose, and holding means for said element, said element being releasable from the holding means with withdrawal of the hose from the supporting and storage means.

5. A hose clamping device for use with a hose supporting and storage means, comprising a support, a member movable on said support into and out of the path of hose withdrawn from said supporting and storage means, having a recess retentively receiving loops of two flattened parts of the hose when in said path, and movable means holding said member in said path retentively engaging the loops of the hose, said means being so disposed as to be immovable by distension of the hose out of its flattened condition but so operatively related to the hose as to be moved by the hose loops for releasing said member from said path upon forcible withdrawal of the hose.

6. A hose clamping device for use with a hose supporting and storage means, comprising a support, a member mounted on said support to move in a substantially horizontal plane into and out of the path of hose withdrawn from said supporting and storage means, having a recess retentively receiving loops of two flattened parts of the hose when in said path, holding means holding said member in said path retentively engaging the loops of the hose, said means being movable in a substantially vertical plane into and out of its holding position, and an element so disposed as to prevent movement of said holding means out of its holding position by distension of the hose out of its flattened condition but so disposed relatively to withdrawing movement of the hose as to allow said holding means to be moved by the hose loops for releasing said member from said path upon forcible withdrawal of the hose.

7. A hose clamping device for use with a hose supporting and storage means, comprising a support having transversely spaced members between which the hose hangs from said means, a clip device pivoted on one of said support members to swing in a substantially horizontal plane inwardly across the space between the members or outwardly away from said space and having an inwardly opening recess to extend around and retentively receive a loop of a flattened part of the hose, and means on the other support member holding said clip device across said space but permitting release of the clip device by forcible withdrawal of the hose outwardly from said space.

8. In a hose clamping device used with a storage means from which the hose is withdrawn for use of the hose and in which are clamped a liquid inlet end part and a liquid outlet end part of the hose in flattened condition, said means having a recess opening in direction opposite to the direction of withdrawal of the hose from the storage means, said recess being adapted to receive said inlet end part and said outlet end part of the hose combined in a pair of loops with the loop of the inlet end part inside the other loop, and said means comprising a part that clamps the loop but yields to a pull on the outlet end of the hose, allowing escape of the outlet end part from the recess, the inlet end part also being dislodged from the recess by the outlet end part.

9. The method of disposing a hose ready for use which comprises connecting one end thereof to a controlled liquid source, flattening said hose and folding it upon itself close to a point midway between said end and its opposite end, rolling up the folded hose from its fold, thereby bringing two end portions of the hose together, making an additional fold, forming a loop, in said portions, and holding said loop with the one end portion inside thereof, for ready release by a pull on said opposite end of the hose.

10. A hose disposed for use having one end connected to a controlled liquid source, flattened and folded upon itself close to a point midway between said end and its opposite end, whereby two flat portions thereof near respective ends thereof lie together, said brought-together portions having loops therein, and means holding said loops ready for release of the looped portions by a pull on said opposite end, the loop of the portion near the one end being inside the loop of the portion near said opposite end.

CHARLES NUHRING.